July 4, 1933.  T. P. WRIGHT ET AL  1,917,078
LANDING GEAR FOR AIRCRAFT
Filed March 19, 1930
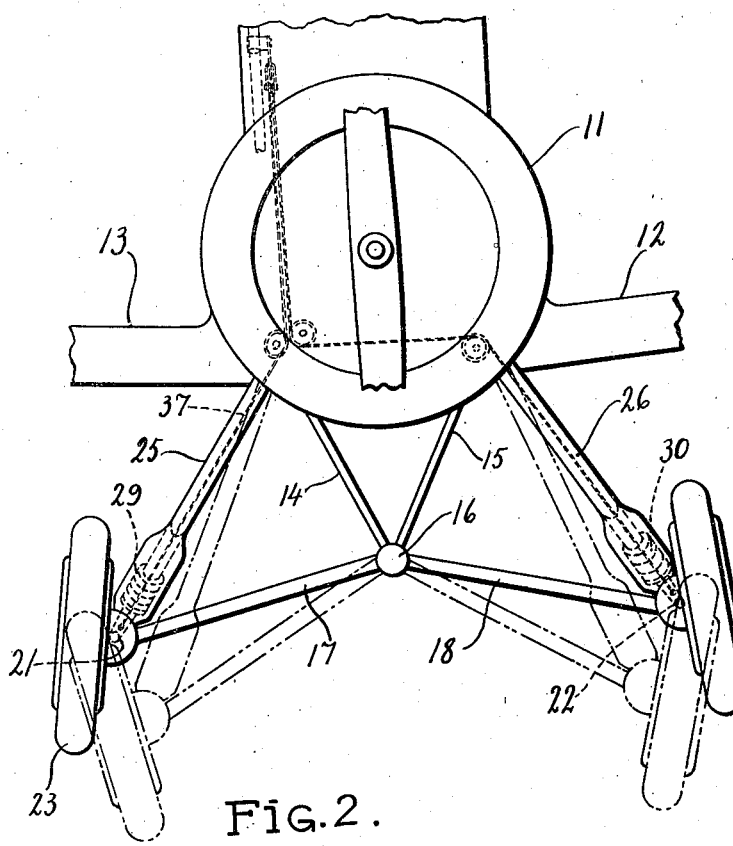
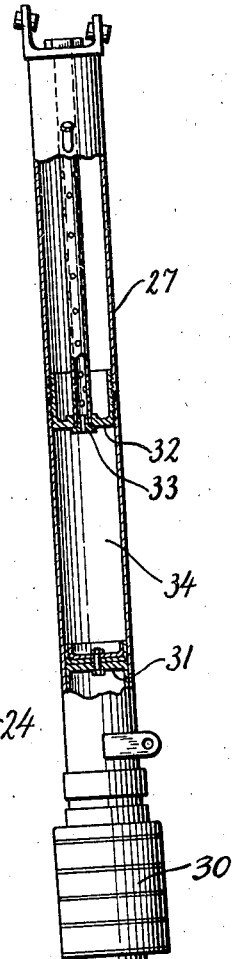
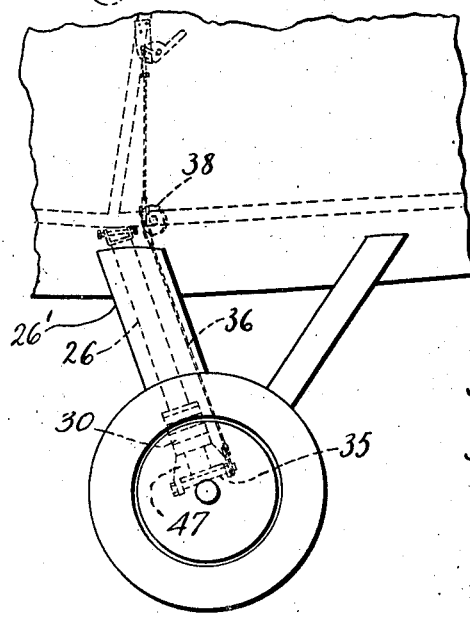
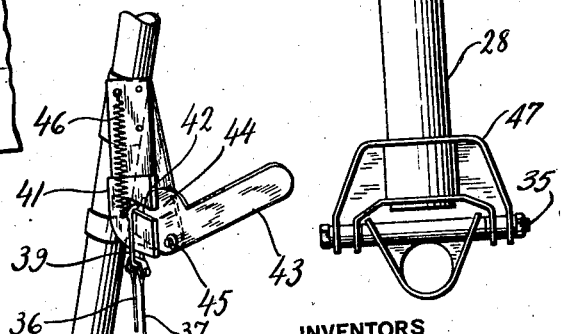
INVENTORS
THEODORE P. WRIGHT AND ROBERT R. OSBORN
BY
ATTORNEY Patented July 4, 1933

1,917,078

UNITED STATES PATENT OFFICE

THEODORE P. WRIGHT, OF PORT WASHINGTON, AND ROBERT R. OSBORN, OF GARDEN CITY, NEW YORK, ASSIGNORS TO CURTISS AEROPLANE & MOTOR COMPANY, INC., A CORPORATION OF NEW YORK

LANDING GEAR FOR AIRCRAFT

Application filed March 19, 1930. Serial No. 436,938.

This application relates to aircraft and more especially to landing gears therefor.

Heretofore, oleo struts have sometimes been included in landing gears for aircraft for the purpose of absorbing landing shocks. Such landing gears have usually been so constructed that when the airplane is in flight the landing wheels are carried at their lowest position with the oleo struts extended. Such designs have the disadvantage that during flight the landing gear is always subject to maximum wind resistance.

Also, heretofore designers of aircraft landing gears have been careful that when the landing wheels are in their uppermost position with the oleo struts retracted, the landing wheels are vertical. With an oleo strut of exceptionally long travel, such a design usually causes the wheels in their lower position to be canted in to such an exaggerated extent, that landing shocks are extremely likely to break the wheels.

One of the objects of our invention is to minimize wind resistance on aircraft when in normal flight.

A further object of our invention is to provide a landing gear having an exceptionally long travel, but still capable of resisting the landing shocks occurring when the landing gear is in its lowermost position.

The conventional oleo shock strut consists of a cylinder holding a fluid and a piston acting against the fluid to force it, under the pressure imposed on it by landing, through an orifice, to retard the movement of the piston. Coordinated with the oleo cylinder is a resilient means such as compressed air, rubber or springs, arranged to continually urge the oleo strut as a whole to its extended position. In such a strut, the force of landing is assumed from the outset by both the oleo mechanism and by the resilient cushioning mechanism. A further object of our invention is to provide an improved form of oleo shock absorber strut that permits the initial landing shock to be absorbed by the oleo action alone; in other words, by the hydraulic action of forcing fluid through an orifice, without the influence of the resilient cushioning means provided for taxiing. After this initial landing shock is absorbed, the resilient taxiing means are brought into action to serve as shock absorbers for taxiing of the airplane on the ground and for takeoff.

Further objects of our invention will be apparent from a reading of the subjoined specification and claims and from a consideration of the accompanying drawing.

In order to explain the invention more clearly, one embodiment thereof is shown in said drawing, in which:

Fig. 1 is a front elevation of a portion of an airplane equipped with one form of our invention, with parts broken away;

Fig. 2 is a side elevation of the airplane shown in Fig. 1 also with parts broken away;

Fig. 3 is a view in detail and on an enlarged scale of the locking mechanism shown in Fig. 2; and Fig. 4 is an enlarged view in detail of the landing gear strut of Fig. 2 with parts broken away and shown in its extended position.

Referring particularly to the drawing, we have shown in Fig. 1 an airplane equipped with a fuselage 11 and wings 12 and 13. Secured to the under side of the fuselage 11 are a pair of fixed struts or braces 14 and 15 which firmly support a fixed pivot 16 for the laterally inclined axles 17 and 18. The outer ends of the axles 17 and 18 are rigidly fastened at 21 and 22 to bearings for the landing wheels 23 and 24. Also pivotally connected at 21 is a compressible landing gear strut 25 and pivotally connected at 22 is a compressible landing gear strut 26. The upper ends of the struts 25 and 26 are pivotally connected to the fuselage 11 of the airplane. Fairing 26' is provided to completely enclose the oleo strut when retracted.

Each of the landing gear struts 25 and 26 is constructed as shown in Fig. 4 with an upper cylindrical section 27 and with a lower cylindrical section 28 which telescopes into the upper section. The upper end of the cylinder 28 is closed by a cap 31 and suitable packing is provided and associated with said cap to prevent the escape past said cap of the oil or other fluid which is used for the purpose of absorbing the landing shocks. A plug 32 provided with a restricted orifice 33 is secured within the cylinder 27 above the upper limit of travel of the piston 31 and means may be provided to adjust the size of said orifice if desired. The orifice 33 is provided in order that the fluid may pass slowly into and out of the space 34 between the plug 32 and the cap 31. Thus, as the cylinder 28 is moved up it will force the fluid through the orifice 33 and up into any suitable receptacle as, for instance, the space shown as provided in the upper part of the cylinder 27. As the cylinder 28 moves downward the fluid may pass down through the orifice 33 into the space 34. The resistance of the fluid in passing through the restricted orifice 33 resiliently absorbs the shocks due to the landing of the aircraft. Annular rubber disks or doughnuts 29 and 30 (see Fig. 1), are provided to cushion shocks after the oleo struts have been retracted by the shock of landing and to absorb taxiing shocks.

It will be noted that the cylinder 28 may travel a considerable distance upward from its extended position before the upper surface of the bracket 47 abuts the lower surface of the rubber doughnuts 30. In this manner the initial landing shock when the airplane touches the ground is absorbed by the upward travel of the cylinder 28, this travel being retarded in its movement by the action of the fluid in the chamber 34 being forced through the orifice 33. When the upper surface of the bracket 47 comes in contact with the lower surface of the rubber doughnuts 30, upward travel of the cylinder 28 is further retarded by the compression of the rubber doughnuts in addition to the passage of the fluid through the orifice 33. Taxiing shocks when the airplane is on the ground are then absorbed through the combined action of the oleo mechanism and of the resilient rubber doughnuts. This, in effect, allows of two phases of operation of the shock absorber strut. The first phase is one of cushioning, wherein the slow passage of the fluid in the strut allows of shock absorption which, however, has no restitutional effect. The second phase provides a resilient effect against the rubber doughnuts, which rubber doughnuts do have restitutional effect for absorbing taxiing shocks, still keeping the strut in a normal partially extended position when the airplane is on the ground.

Restitution of the shock strut to its fully extended position, when the airplane leaves the ground, is accomplished in two phases. The first phase consists of the extension of the resilient rubber doughnuts to their own fully extended position, thus forcing the bracket 47 and the cylinder 28 along with them. Then, when the airplane is in the air, an additional extension of the cylinder 28 to its fully extended position may occur under the influence of gravity, the bracket 47 dropping away from contact with the rubber doughnuts 30. Such further extension is slowed up by the passage of the shock absorbing oleo fluid through the orifice 33 back into the chamber 34. This second stage of extension is only possible when the airplane is in the air. On the ground, the bracket 47 will always be in contact with the rubber doughnuts 30.

We provide means whereby the landing gear shock absorber struts may be retained in a partially retracted position; that is, at a point where the bracket 47 abuts the lower surface of the rubber doughnuts 30, without compression of the rubber doughnuts. This retraction in flight eliminates the added drag occasioned by the extended portion of the cylinder 28.

Associated with each of the wheels 23 and 24 there are provided bolts such as the bolt shown at 35, which may coincide with the pivots 21 and 22. Cables 36 and 37 are attached respectively to each of these bolts, pass upward over pulleys similar to the pulley 38, and are secured at their upper ends to the link 39. A fitting 41 (Fig. 3) is provided with a downwardly inclined slot 42 into which the link 39 is adapted to be inserted. A lever 43 provided with an enlarged arcual portion 44 is pivoted at 45 and as clearly appears in said Fig. 3 is adapted to lock the link 39 in its position within the slot 42 and thus secure the wheels 23 and 24 in their upper position or to be rotated to allow the link 39 to slip out of the slot 42. A flexible connection such as the spring 46 may be provided to insure that the link 39 remains always convenient to the pilot.

It is to be noted that the wheels 23 and 24 are so secured to the landing gear that when in their upper position they are canted out while in their lower position they are canted in. By reason of this arrangement we insure that the landing wheels are always in a position in which they are able to withstand the loads which may be placed upon them. Thus, when in the down or landing position, they are canted in, but are not canted in to such an excessive extent that they are substantially weakened by the angle of impact. Also, when they are in their upper or taxiing position they are canted out but are not canted out to such an excessive extent that they are substantially weakened by reason of the angle between them and the vertical.

It is thought that the operation of the device illustrating our invention will be clear from the above description. When the airplane is upon the ground the wheels 23 and 24 will be in their upper position, i. e., in the position shown in full lines in Fig. 1. In such position they are slightly canted out but are not at an excessive angle to the vertical. While in such position the landing gear struts 25 and 26 are compressed by the weight of the airplane acting through them to the wheels 23 and 24. The weight of the airplane is resiliently supported by the rubber doughnuts 29 and 30. By the clockwise rotation of the handle 43 from the position shown in Fig. 3 the slot 42 may be uncovered for the insertion of the link 39, and it is possible for the pilot to insert the link 39 in the slot 42 with ease. After the insertion of the link 39 he may rotate the handle 43 in a counter-clockwise direction to the position shown in Fig. 3 and thus lock the link 39 within the slot and through the cables 36 and 37 maintain the wheels 23 and 24 in their upper positions. It is to be noted that the force which is imposed upon the cables 36 and 37 is only that of the weight of the landing gear structure and does not include any force exerted by the resilient doughnuts 29 and 30 inasmuch as the landing gear is carried in a position with said doughnuts fully extended. Moreover, the oleo structure itself, although it absorbs shocks when landing, does not, when compressed, exert any substantial downward pull on the cables 36 and 37. While in normal flight the wheels 23 and 24 are thus maintained in their upper position and the oleo struts retracted so that a minimum of air resistance is imposed upon the airplane by reason of the landing gear. However, when the pilot approaches the landing he rotates the handle 43 and thus allows the wheels 23 and 24 to move downward. They do this relatively slowly, due to the slow passage of the fluid through the opening 33 until they reach their lowest position. When the airplane comes to the landing the shocks of the landing are absorbed by the oleo absorbers by means of the slow passage of the fluid through the restricted openings 33. Thereafter, the taxiing shocks on the airplane are absorbed mainly by the doughnuts 29 and 30.

It is to be understood that the above described embodiment of the invention is for the purpose of illustration only and various changes may be made therein without departing from the spirit and scope of the invention.

We claim as our invention:

1. In an airplane; a landing gear including an oleo shock absorber for absorbing the landing shocks; a fairing for minimizing the air resistance of said shock absorber; and means for optionally maintaining said shock absorber completely enclosed within said fairing even while the airplane is in the air.

2. In an airplane shock absorbing strut, a cylinder, a piston adapted to slide within said cylinder, resilient rubber rings surrounding said cylinder, a bracket on said piston adapted to either engage or disengage said rings, and releasable means adapted to hold said bracket adjacent said rings.

3. In an airplane landing gear adapted to deflect under impact, members having a plurality of shock absorbing mechanisms associated therewith, said mechanisms being arranged to successively and cumulatively become operable as said landing gear deflects, and releasable means adapted to deflect a portion of said shock absorbing mechanisms.

4. In an airplane, a compressible landing gear shock absorbing strut comprising a fluid shock absorbing mechanism, a resilient taxiing mechanism having a travel substantially less than the travel of said fluid shock absorbing mechanism, and releasable means to retain said strut in a partly compressed position.

5. In an airplane, a landing gear shock absorbing strut comprising a fluid shock absorbing mechanism, a resilient taxiing mechanism operable after the shock absorption of said fluid shock absorbing mechanism is nearly spent, and releasable means to retain said strut in a partly compressed position.

6. In an airplane landing gear strut, a cylinder adapted to hold a fluid, a piston movable slidably within said cylinder and having defined limits of travel, resilient means associated with the cylinder, adapted to be either compressed or extended an amount substantially less than the defined limits of travel of said piston, and releasable means adapted to hold said piston well within said cylinder.

7. In an airplane, a landing gear including oleo shock absorbers each having two phases of deflection, one phase having cushioning properties and the second phase having resilient properties, a pair of landing wheels connected with said oleo shock absorbers, a cable connected with each of said landing wheels, and means for fastening said cables whereby the wheels may be maintained in an elevated position and the shock absorbers may be maintained in a position characterized by retraction through said first phase of deflection.

8. In an airplane, a landing gear including oleo shock absorbers each having two phases of deflection, one phase having cushioning properties and the second phase having resilient properties, a pair of landing wheels, means for retracting said shock absorbers through said first phase of deflection and for retracting said wheels to an upper outwardly canted position, and means for maintaining said shock absorbers and said wheels in said retracted positions.

9. In an airplane, a landing gear including oleo shock absorbers each having two phases of deflection, one phase having cushioning properties and the second phase having resilient properties, a pair of landing wheels, and means for simultaneously retracting said shock absorbers through said first phase of deflection and for retracting said wheels to an upper outwardly canted position.

In testimony whereof we hereunto affix our signatures.

THEODORE P. WRIGHT.
ROBERT R. OSBORN.